UNITED STATES PATENT OFFICE.

THEODOR E. BREYER, OF WILMETTE, ILLINOIS, ASSIGNOR TO CORN PRODUCTS REFINING COMPANY, OF CHICAGO, ILLINOIS, A CORPORATION.

MOLD FOR CONFECTIONERY.

1,074,600.  Specification of Letters Patent.  Patented Oct. 7, 1913.

No Drawing.  Application filed September 7, 1910.  Serial No. 580,863.

*To all whom it may concern:*

Be it known that I, THEODOR E. BREYER, a citizen of the United States, residing at Wilmette, county of Cook, and State of Illinois, have invented a new and useful Improvement in Molds for Confectionery, of which the following is a specification.

The object of my invention is to produce a mold particularly adapted for use in the forming of confectionery, candy and the like.

It is well known that certain kinds of confectionery, such as chocolate cream centers, cream fondants, jelly beans, gum drops, etc., are made by pouring into starch molds a hot syrup of the proper mixture and allowing the same to cool or crystallize into a more or less firm mass. These starch molds are made by filling a tray with starch and pressing into the same suitable patterns. In order to obtain confectionery of perfect shape it is necessary that the molds thus formed possess a certain degree of firmness. It is the experience of the practical manufacturer that the starch which is furnished him for making these molds, lacks the desired degree of plasticity, and hence does not produce a firm mold. For this reason fresh starch makes poor molds, and it is only after the starch has been frequently used for this purpose that it gives tolerable results in respect to plasticity, when it has become otherwise objectionable. The confectioner is, therefore, compelled to use this starch over and over again, adding only enough clean starch to replenish the waste. Thus used, the material is insanitary, infected with germs, and of dirty appearance. While this molding starch does not enter largely into the confectionery proper it does contact with it, and is liable to impair the taste, appearance, wholesomeness and keeping qualities of the confectionery molded in such starch.

In order to remedy the above difficulties I have invented a plastic starch which, while clean, constitutes a superior mold in the forming of confectionery. This mold is made by mixing with ordinary powdered or granular mill starch a relatively small amount of an unctuous substance, under which term I include fats, oils, wax, or hydrocarbons, either liquid or solid, such as for instance, beef tallow, corn oil, paraffin oil, paraffin wax, beeswax etc. The amount of the unctuous substance required to make the starch plastic need be but a small percentage, and will naturally vary in accordance with the particular unctuous substance used and in accordance with the degree of plasticity to be imparted to the starch. I do not wish, therefore, to limit myself to any specific proportions of starch and unctuous substance further than to say that the percentage of the substance used is small as compared with the percentage of starch used. For instance, I have found that about two-tenths of one per cent. of corn oil is sufficient to give the starch the proper degree of plasticity for use in confectionery molds. In the case of paraffin wax and paraffin oil, I have found that a tenth of one per cent, was sufficient to render the starch plastic for the same use.

A preferred manner of carrying out my process is as follows: A certain quantity of mill starch in finely divided or ganular condition is placed in the mixing apparatus, which is preferably steam-jacketed. This permits the use of solid fats, wax or hydrocarbons. To the starch in the mixing apparatus is added the proper amount of the unctuous substance. The mixing apparatus is rotated or agitated under heat when a solid unctuous substance is used and without heat when a liquid unctuous substance is used until the unctuous substance is thoroughly intermixed with the starch, so as to produce a plastic mass. The temperature to which the mixture is raised depends upon the particular unctuous substance used, and is governed by the melting point of that substance. A heat sufficient to melt the solid unctuous substance will be adequate to cause intimate and uniform intermixing of the ingredients.

The process may, of course, be varied in its operation, depending upon the particular kind of apparatus used, the kind of unctuous substance used, the amount of starch to be rendered plastic, etc. I have not, therefore, deemed it necessary to an understanding of my invention to describe any of these accompanying details.

Obviously, my plastic starch mold may be put to various uses, besides the specific use herein mentioned by way of illustration.

Having thus described my invention what I claim as new and desire to secure by Letters Patent of the United States is:

1. As a composition of matter, ordinary confectioner's starch rendered plastic through the intimate association therewith of a small percentage of corn oil.

2. As a composition of matter suitable for use and re-use as confectioner's molds, ordinary powdered starch associated with a relatively small amount of unctuous substance and in a plastic condition, the proportion of unctuous substance being such that after use the material may be prepared for re-use by simple sifting.

3. As a composition of matter suitable for use a confectioner's molds, granular mill starch associated with about two-tenths of one per-cent. unctuous substance capable of rendering the material plastic enough to form a firm mold and easily returnable and after use being capable of return to its original useful condition by simple sifting.

4. The product herein described and composed solely of fresh mill starch intimately associated with approximately two-tenths of one per-cent. unctuous substance so that the resultant product is plastic enough and otherwise suited for repeated use as confectioner's molds.

5. The product herein described and composed solely of fresh starch intimately associated with approximately two-tenths of one per cent. corn oil.

THEODOR E. BREYER.

Witnesses:
W. H. RADKE,
M. I. DALEY.

Copies of this patent may be obtained for five cents each, by addressing the "Commissioner of Patents, Washington, D. C."